United States Patent [19]
Lokhandwala

[11] Patent Number: 6,053,965
[45] Date of Patent: Apr. 25, 2000

[54] FUEL GAS CONDITIONING PROCESS

[75] Inventor: Kaaeid A. Lokhandwala, Union City, Calif.

[73] Assignee: Membrane Technology and Research, Inc., Menlo Park, Calif.

[21] Appl. No.: 09/172,748

[22] Filed: Oct. 14, 1998

[51] Int. Cl.[7] .................................................. B01D 53/22
[52] U.S. Cl. ........................................ 95/49; 95/50; 95/52
[58] Field of Search ................................ 95/39, 45, 47–55

[56] References Cited

U.S. PATENT DOCUMENTS

| | | | |
|---|---|---|---|
| 3,534,528 | 10/1970 | Porter | 95/49 |
| 4,370,150 | 1/1983 | Fenstermaker | 55/16 |
| 4,561,864 | 12/1985 | Klass et al. | 95/49 |
| 4,597,777 | 7/1986 | Graham | 95/51 |
| 4,681,612 | 7/1987 | O'Brien et al. | 95/39 X |
| 4,857,078 | 8/1989 | Watler | 55/16 |
| 4,963,165 | 10/1990 | Blume et al. | 55/16 |
| 5,089,033 | 2/1992 | Wijmans | 95/49 |
| 5,199,962 | 4/1993 | Wijmans | 95/39 |
| 5,205,843 | 4/1993 | Kaschemekat et al. | 55/16 |
| 5,281,255 | 1/1994 | Toy et al. | 95/50 |
| 5,352,272 | 10/1994 | Moll et al. | 96/9 |
| 5,374,300 | 12/1994 | Kaschemekat et al. | 95/39 |
| 5,401,300 | 3/1995 | Lokhandwala et al. | 95/51 X |
| 5,501,722 | 3/1996 | Toy et al. | 95/50 |
| 5,727,903 | 3/1998 | Borray et al. | 95/50 X |
| 5,755,855 | 5/1998 | Baker et al. | 95/50 X |
| 5,762,685 | 6/1998 | Baker et al. | 95/39 |
| 5,964,923 | 10/1999 | Lokhandwala et al. | 95/39 X |

*Primary Examiner*—Robert H. Spitzer
*Attorney, Agent, or Firm*—J. Farrant

[57] ABSTRACT

A process for conditioning natural gas containing $C_{3+}$ hydrocarbons and/or acid gas, so that it can be used as combustion fuel to run gas-powered equipment, including compressors, in the gas field or the gas processing plant. Compared with prior art processes, the invention creates lesser quantities of low-pressure gas per unit volume of fuel gas produced. Optionally, the process can also produce an NGL product.

20 Claims, 6 Drawing Sheets

FUEL GAS CONDITIONING PROCESS

This invention was made with Government support under Contract Number DE-FG03-95ER82022, awarded by the Department of Energy. The Government has Certain rights in this invention.

FIELD OF THE INVENTION

The invention relates to the upgrading of raw natural gas to run field engines. More particularly, the invention relates to the use of a separation membrane in conjunction with cooling to achieve such upgrading.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide or water vapor. On the other hand, streams that contain relatively large proportions of heavier hydrocarbons and/or other contaminants are common. Before the raw gas can be sent to the supply pipeline, it must usually be treated to remove at least one of these contaminants.

As it travels from the wellhead to the processing plant and ultimately to the supply pipeline, gas may pass through compressors or other field equipment. These units require power, and it is desirable to run them using gas engines fired by natural gas from the field. Since the gas has not yet been brought to specification, however, this practice may expose the engine to fuel that is of overly high Btu value, low octane number, or corrosive.

In the gas-processing plant itself, heavy hydrocarbons are often removed by condensation. Such a method is impractical in the field, however, because sources of external cooling or refrigeration are not available. Furthermore, cooling of the raw gas, which still contains substantial quantities of water vapor, is likely to bring the gas to a pressure/temperature/composition condition under which hydrates can begin to crystallize, thereby clogging the condensation equipment and preventing gas flow.

That membranes can separate $C_{3+}$ hydrocarbons from gas mixtures, such as natural gas, is known, for example from U.S. Pat. Nos. 4,857,078, 5,281,255 and 5,501,722. Separation of acid gases from other gases is taught, for example, in U.S. Pat. No. 4,963,165. It has also been recognized that condensation and membrane separation may be combined, as is shown in U.S. Pat. Nos. 5,089,033; 5,199,962; 5,205,843 and 5,374,300.

It is also known to operate membrane systems at reduced temperatures by deliberately cooling the incoming feed stream, as is taught in U.S. Pat. No. 5,352,272, and to use the Joule-Thomson cooling produced by transmembrane permeation to facilitate upstream condensation, as is taught in U.S. Pat. No. 5,762,685.

The problem of upgrading raw gas in the field, such as to sweeten sour gas, is addressed specifically in U.S. Pat. No. 4,370,150, to Fenstermaker. In this patent, Fenstermaker teaches a process that uses a membrane, selective for hydrogen sulfide and/or heavier hydrocarbons over methane, to treat a side stream of raw gas. The process produces a membrane residue stream of quality appropriate for engine fuel. The contaminants pass preferentially through the membrane to form a low-pressure permeate stream, which is returned to the main gas line upstream of the field compressor. Such a process relies on there being sufficient compressor capacity available to handle the return stream that is recycled to the compressor inlet. However, if the raw gas requires more than a minor adjustment in composition, the proportion of gas that has to be recycled to the compressor may be comparatively large. For example, to upgrade the methane content from 70% to 80%, or from 80% to 90%, may require as much as 50% of the gas being treated by the membrane to be returned for recompression. If the gas is more heavily contaminated, such as containing hydrogen sulfide at the percent level, for example, as is not uncommon, the proportion returned on the low pressure side may be even higher, such as 60% or more. As well as diverting compressor capacity, this makes for an inefficient use of fuel, since fuel gas created by the membrane is used in part to recompress the fuel reject stream.

There remains a need for a process that provides an acceptable fuel gas for field use, but that is more efficient in terms of fuel use and recompression requirements.

SUMMARY OF THE INVENTION

The invention is a process for conditioning natural gas containing $C_{3+}$ hydrocarbons and/or acid gas, so that it can be used as combustion fuel to run gas-powered equipment, including compressors, such as at the wellhead or elsewhere in the field upstream of the gas processing plant.

The invention differs from previous membrane-based processes available for field engine fuel conditioning in that it creates substantially lesser quantities of low-pressure gas per unit volume of fuel gas produced.

This is achieved by using a membrane separation step in conjunction with a condensation step under pressure, for which the cooling is provided by the membrane separation step, and by balancing the amount of contaminants removed in the condensation and membrane separation steps.

The process is carried out on at least part of a natural gas stream that is at high pressure, typically, although not necessarily, after it has passed through a compressor.

In its basic form, the process of the invention comprises:
(a) withdrawing a portion of gas from the high-pressure gas stream;
(b) passing the portion through a heat-exchange step in heat-exchanging relationship against a membrane residue stream, thereby cooling the portion;
(c) separating the portion into a liquid phase comprising $C_{3+}$ hydrocarbons and a gas phase depleted in $C_{3+}$ hydrocarbons;
(d) providing a membrane unit having a feed side and a permeate side and containing a membrane selective for $C_{3+}$ hydrocarbons over methane;
(e) passing the gas phase across the feed side under conditions in which transmembrane permeation occurs;
(f) withdrawing from the feed side the membrane residue stream;
(g) withdrawing from the permeate side a membrane permeate stream enriched in $C_{3+}$ hydrocarbons compared with the gas phase;
(h) passing the membrane residue stream to the heat exchange step (b);
(i) withdrawing the membrane residue stream from the heat exchange step; and optionally:
(j) using the membrane residue stream as combustion fuel for a prime mover.

The process removes $C_{3+}$ hydrocarbons and/or acid gas from the raw gas, thereby enabling prime movers such as field engines, turbines and the like to be run using gas that would otherwise be too rich in heavy hydrocarbons or too contaminated with acid gas. Thus the process provides a cleaner-burning fuel and reduces engine problems or damage associated with knocking.

Steps (b) and (c) give rise to a discrete liquid phase that includes the heavier hydrocarbons that have condensed under the prevailing pressure and temperature conditions, as well as dissolved hydrogen sulfide, if present, water and small amounts of dissolved light hydrocarbons. In some situations, this NGL product itself has value and can be trucked off-site for further treatment, if necessary, and sale. If it is not required as a separate phase, the NGL can be reintroduced into the gas stream. By maintaining it at pressure, this heavier hydrocarbon phase can be reintroduced on the downstream, high-pressure side of the compressor, and thus does not have to pass again through the compressor. This is an important benefit of the invention.

The liquid hydrocarbon phase is produced by cooling the incoming gas, preferably by heat exchange against the membrane residue stream. Permeation of $C_{3+}$ hydrocarbons can give rise to a permeate stream, and hence a residue stream, that is, for example, 10° C. or 20° C. cooler than the membrane feed stream. The temperature of the residue stream can be reduced further by lowering its pressure, such as to the pressure at which it will be fed to the engine fuel intake. This results in substantial additional cooling, in some cases to a temperature as low as −20° C. or below. Using this very cold stream for heat exchange enables substantial quantities of contaminants to be liquefied upstream of the membrane separation step. A particular benefit is that this can be done without necessitating any external cooling source.

Since the membranes used in the invention are selectively permeable not only to $C_{3+}$ hydrocarbons and acid gases, but also to water vapor, the membrane residue stream exiting the membrane separation step is both leaner and dryer than the membrane feed stream. This leaner, dryer stream can, therefore, be let down to the fuel gas pressure with less likelihood of ice or hydrate formation than would be the case if the untreated stream were to be lowered to fuel gas pressure.

Because some of the contaminant content is removed from the fuel stream without passing into the membrane permeate stream, the amount of low-pressure permeate is small in proportion to the side stream that is drawn off to be treated for fuel. Indeed, it is a goal of the process, subject to other operating constraints, to control the amount of permeate produced as a fraction of the gas withdrawn from the main stream to create the fuel. For example, the permeate stream may represent as little as 40% by volume of the stream withdrawn for treatment, and is frequently less, such as 30%, 25% or even as little as 20% or less. This keeps the recompression requirements low, as well as providing efficient use of the fuel thus generated. In this way, the process achieves a significant improvement over prior art processes, where, typically, close to 45%, 50% or more of the side stream must be recompressed.

Another aspect of the goal of controlling the amount of low-pressure permeate is the balance between the hydrocarbons removed in the liquid phase and the hydrocarbons removed in the membrane permeate stream. Most preferably, these amounts should be roughly equal. In quantitative terms, the removed hydrocarbons should preferably be distributed between about 30 wt % and 70 wt % in the liquid condensate, the balance in the permeate.

The process of the invention is essentially passive, in most cases requiring no additional rotating equipment beyond what is already present in the field.

Heat exchange between the withdrawn stream and the membrane residue stream may be carried out in one or multiple stages. Most preferably, a first heat exchange step is carried out using the cooling provided by the residue stream from the membrane modules without expansion, then the residue stream is reduced in pressure and a second heat exchange step at lower temperature is carried out. Reducing the temperature in stages provides better control over hydrate formation than if the raw stream, fully laden with water and heavy hydrocarbons, is immediately lowered in temperature by 15–20° C. or more.

The permeate stream is conveniently and preferably returned to the inlet side of the field compressor for which the fuel is being prepared. Alternatively, it can be returned to any other stream of suitable pressure and composition, or otherwise disposed of.

In its most preferred form, the invention involves the following steps:
(a) withdrawing a portion of gas from the high-pressure gas stream downstream of a compressor;
(b) passing the portion through a first heat-exchange step in heat-exchanging relationship against a membrane residue stream, thereby cooling the portion;
(c) separating the portion into a first liquid phase, comprising $C_{3+}$ hydrocarbons, hydrogen sulfide and water, and a first gas phase depleted in $C_{3+}$ hydrocarbons, hydrogen sulfide and water vapor;
(d) passing the membrane residue stream through an expansion valve, thereby cooling the residue stream;
(e) passing the first gas phase through a second heat-exchange step in heat-exchanging relationship against the membrane residue stream, thereby cooling the first gas phase;
(f) separating the first gas phase into a second liquid phase, comprising $C_{3+}$ hydrocarbons, hydrogen sulfide and water, and a second gas phase depleted in $C_{3+}$ hydrocarbons, hydrogen sulfide and water;
(g) providing a membrane unit having a feed side and a permeate side and containing a membrane selective for $C_{3+}$ hydrocarbons, hydrogen sulfide and water vapor over methane;
(h) passing the second gas phase across the feed side under conditions in which transmembrane permeation occurs;
(i) withdrawing from the feed side the membrane residue stream;
(j) withdrawing from the permeate side a membrane permeate stream;
(k) passing the membrane residue stream to the first heat exchange step, thereby carrying out step (b);
(l) after the second heat exchange step, using the membrane residue stream as fuel for a prime mover that drives the compressor;
the process being characterized in that, expressed in total weight or mass flow terms, the $C_{3+}$ hydrocarbons removed in the liquid phases and the $C_{3+}$ hydrocarbons removed in the membrane permeate stream are roughly equal.

In summary, the invention provides the following benefits:
1. Enables engines and turbines to be run using otherwise sub-quality gas.
2. Avoids damage to engines by out-of-spec gas.
3. Produces only small amounts of gas for recompression.
4. Uses produced fuel efficiently.
5. Requires small membrane area.

6. Produces NGL fraction for resale if desired.
7. Produces a liquid fraction without requiring any external chilling.
8. Enables high-pressure gas to be let down to fuel gas pressure without ice or hydrate formation.

Although it is described herein principally as it relates to conditioning gas for use as engine or turbine fuel, it will be apparent to those of skill in the art that the process could be applied to lighten, sweeten or dry high-pressure gas streams for any purposes where control of the quantity of low-pressure gas produced is desired. The treatment of high-pressure gas streams consistent with the teachings herein is within the scope of the invention whether applied to preparation of engine fuel or for any other purpose.

It is to be understood that the above summary and the following detailed description are intended to explain and illustrate the invention without restricting its scope.

DETAILED DESCRIPTION OF THE INVENTION

Figure 1:
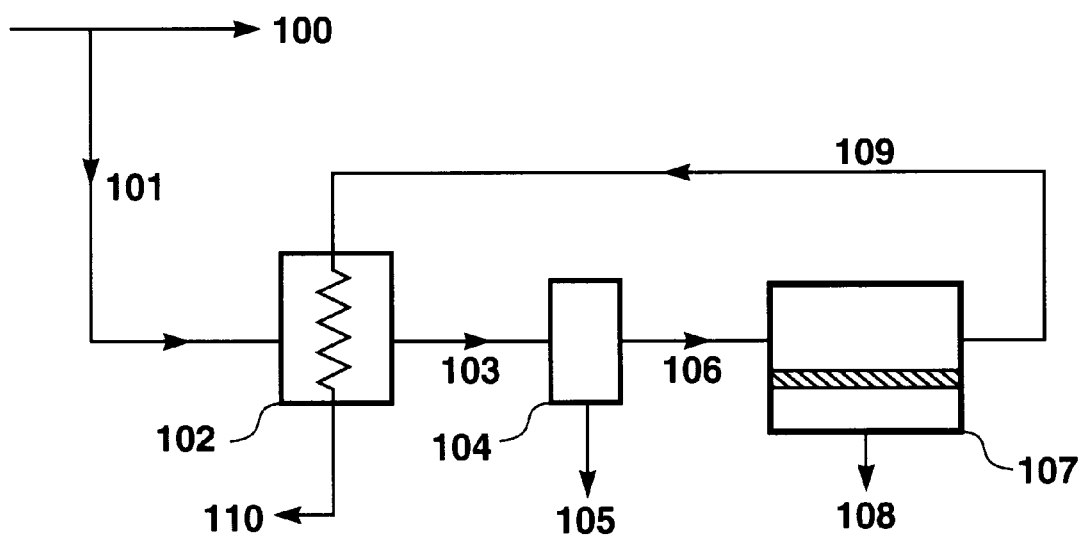
FIG. 1 is a schematic drawing of a basic embodiment of the invention.

The term gas as used herein means a gas or a vapor.

The terms $C_{3+}$ hydrocarbon and heavier hydrocarbon mean a hydrocarbon having at least three carbon atoms.

The term high-pressure gas stream means a gas stream at a pressure of at least 100 psia The terms lighter and leaner mean reduced in $C_{3+}$ hydrocarbons content.

The term sweeter means reduced in hydrogen sulfide content.

The terms two-step and multistep as used herein mean an arrangement of membrane modules or banks of membrane modules connected together such that the residue stream from one module or bank of modules becomes the feedstream for the next.

The terms two-stage and multistage as used herein mean an arrangement of membrane modules or banks of membrane modules connected together such that the permeate stream from one module or bank of modules becomes the feedstream for the next.

The term membrane array means a set of membrane modules or banks of modules connected in multistep arrangement, multistage arrangement, or mixtures or combinations of these.

The term product residue stream means the residue stream exiting a membrane array when the membrane separation process is complete. This stream may be derived from one membrane bank, or may be the pooled residue streams from several membrane banks.

The term product permeate stream means the permeate stream exiting a membrane array when the membrane separation process is complete. This stream may be derived from one membrane bank, or may be the pooled permeate streams from several membrane banks.

Percentages herein are by volume unless otherwise stated.

The invention is an improved process for conditioning natural gas containing $C_{3+}$ hydrocarbons and/or acid gas, so that it can be used as fuel to run engines or turbines in the gas field or elsewhere as appropriate, or for any other purpose. In general, engines can operate on a poorer quality of gas than is needed to meet supply pipeline specification. For example, pipeline specification is typically no more than 4 ppm hydrogen sulfide, no more than 1–3% carbon dioxide, no more than about 140 ppm water vapor, and a hydrocarbon dewpoint below 0° C. at 1,000 psia, which translates roughly to a total $C_{3+}$ hydrocarbon content of no more than about 5%, of which no more than about 1–2% is $C_{4+}$ hydrocarbons. In contrast, a field engine may be able to operate satisfactorily on a gas that contains, for example, as much as 1,000 ppm of hydrogen sulfide and/or 10% total $C_{3+}$ hydrocarbons.

Nevertheless, many or most raw streams do not meet this specification. The streams that may be treated by the process of the invention are diverse and include, without limitation, those that contain excess $C_{3+}$ hydrocarbons, large amounts of acid gases, specifically hydrogen sulfide or carbon dioxide, and/or large amounts of water vapor. The methane content of the raw gas may be any value, but commonly will be in the range 50–99% methane, and most typically will be in the range 60–95% methane.

The invention involves removing contaminants from raw gas to meet engine or turbine fuel specification by passing a stream of the raw gas across a contaminant-selective membrane. The amount of gas in the low-pressure, contaminant-concentrated permeate is controlled by removing a portion of the heavy hydrocarbons by condensation at the raw gas pressure before the gas reaches the membrane. Among other considerations, the invention has to balance three needs: the need to meet specification for the membrane residue stream, the need to keep the permeate volume as low as possible, and the need to avoid hydrate formation in the cooling step.

The invention in its most basic form is shown schematically in FIG. 1. Referring to this figure, stream 101 is the stream to be treated by the process, which is withdrawn from a natural gas stream at high pressure, 100. For the process to provide a useful separation between the $C_{3+}$ hydrocarbons and methane or between the acid gas components and methane, the pressure of stream 101 should be at least about 100 psia. However, the gas has usually passed through a compressor as part of the gas-gathering process in the field and will typically be at a pressure of at least about 150 psia, and frequently higher, such as 500 psia or above, 1,000 psia or above, or 1,500 psia or above.

Stream 101 passes into heat exchanger 102, which may be of any convenient type, such as, but not necessarily, shell-and-tube. Here the gas is brought into heat-exchanging relationship with the membrane residue stream, 109. It has been recognized for some time that the transport of gas from feed to permeate side in membrane separation processes can be viewed as a non-ideal gas expansion, and thus manifests Joule-Thomson cooling. As it passes through the membrane to the low-pressure side, the permeate gas expands and cools. Because the feed and permeate sides of a membrane are in good thermal contact, cooling of the residue stream also results.

The degree of cooling that occurs depends on the amount of gas that expands through the membrane, the pressure change, and the physical properties of the gas itself. For organic components such as $C_{3+}$ hydrocarbons, cooling of 5° C., 10° C., 15° C., 20° C. or more can occur, provided that a significant amount of the organic component can pass through the membrane and the difference between the feed and permeate pressure is reasonably large. Use of a membrane expansion device based on this principle to provide cooling for condensation is taught in U.S. Pat. No. 5,762,685. For the present purposes, the full teachings of this patent cannot be followed because the membrane unit is required primarily to be a separation device, not an expansion device. As such, the goals are to produce a fuel gas that meets, for example, field engine specification, at the same time controlling the amount of permeate that is produced. Meeting these goals limits the amount of gas that can be allowed to expand to the low-pressure side, and hence the cooling achieved. Nevertheless, cooling of 5° C., 10° C. or more occurs based on the pressure and composition conditions of many raw field gases.

Cooling results in the formation of two-phase mixture 103, which passes into phase separator 104. The liquid phase, containing liquefied hydrocarbons, water and dissolved gases, is withdrawn as condensate stream 105. If hydrogen sulfide is present in the raw field gas, it will tend to partition into the liquid phase. Thus the condensation step, even if operated at a comparatively high temperature; can provide some gas-sweetening capability. The destination of liquid phase 105 depends on the specific circumstances in which the process is being carried out. In regions of the country or the world where there is a market for natural gas liquids (NGL) the liquid may be collected, sent for further treatment, if desired, and sold. If the NGL phase is not required as a separate product, it is convenient, and it is most preferred, to return it to the main gas flow. Since this fraction has not passed through the membrane unit, it remains at pressure and can simply be allowed to vaporize into the high-pressure gas stream in any convenient manner.

Liquefying and then revaporizing a portion of the stream under treatment appears, at first sight, to be inefficient and purposeless. However, as will be appreciated by those of skill in the art based on the present teachings, this liquefaction can be achieved without the necessity to provide external refrigerants or additional power sources. Thus, the liquefaction step provides a means for contaminant materials to bypass the membrane separation step entirely, to be retained at high pressure, and yet to be removed from the fuel gas at no additional cost or difficulty.

The gas phase from the separator, stream 106, passes to the membrane separation unit 107. This unit contains a membrane that is selective for $C_{3+}$ hydrocarbons over methane. To provide such selectivity, the membrane is preferably made from an elastomeric or rubbery polymer. Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly (butene-1), polystyrene-butadiene copolymers, styrene/butadiene/styrene block copolymers, styrene/ethylenelbutylene block copolymers, thermoplastic polyolefin elastomers, and block copolymers of polyethers, polyamides and polyesters. Silicone rubber is the most preferred material for separating $C_{3+}$ hydrocarbons from methane. Another type of preferred membrane, if the contaminant of primary concern is hydrogen sulfide, is one in which the selective layer is a polyamide-polyether block copolymer having the general formula

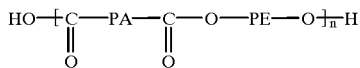

where PA is a polyamide segment, PE is a polyether segment and n is a positive integer. Such polymers are available commercially as Pebax® (Atochem Inc., Glen Rock, N.J.) or as Vestamid® (Nuodex Inc., Piscataway, N.J.). These types of materials are described in detail in U.S. Pat. No. 4,963,165, and their use in treating gas streams laden with acid gases is described, for example, in U.S. Pat. No. 5,407,467. These materials also exhibit selectivity in favor of $C_{3+}$ hydrocarbons over methane, but are generally slightly less selective in that regard than silicone rubber.

Alternatively, the membrane can be made from a super-glassy polymer. Super-glassy polymers have a rigid structure, high glass transition temperatures, typically above 100° C., 200° C. or higher, and have unusually high free volume within the polymer material. These materials have been found to exhibit anomalous behavior for glassy polymers, in that they preferentially permeate larger, more condensable, organic molecules over smaller inorganic or less condensable organic molecules. The best known super-glassy polymer is poly(trimethylsilylpropyne) [PTMSP], the use of which to preferentially separate condensable components from lower-boiling, less condensable components is described in U.S. Pat. No. 5,281,255, for example. This type of membrane would be useful in the present invention as an organic-component selective membrane.

Yet another alternative is to use finely microporous inorganic membranes, such as the adsorbent carbon membranes described in U.S. Pat. No. 5,332,424, the pyrolysed carbon membranes described in U.S. Pat. No. 4,685,940, or certain ceramic membranes. These membranes are, in general, more difficult to make and less readily available than polymeric membranes, and are less preferred, although they may be useful in some circumstances.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If super-glassy membranes are used, they may be formed as integral asymmetric or composite membranes.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules is the most preferred choice.

Membrane unit 107 may contain a single membrane module or bank of membrane modules or an array of modules. A single-stage membrane separation operation is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements. If an array of membrane modules is used, the preferences cited below for controlling permeate volume refer to the overall product permeate output of the array. For example, in FIG. 4, explained in more detail below, the product permeate flow is the sum of the flows of streams 413 and 416.

In cases where substantial amounts of both $C_{3+}$ hydrocarbons and hydrogen sulfide must be removed, an optional preferred configuration is two-step, with one bank of membrane modules containing silicone rubber membranes for better $C_{3+}$ hydrocarbon removal and the other bank containing polyamide-polyether block copolymer membranes for better hydrogen sulfide removal, as discussed in more detail below.

High-pressure stream 106 flows across the membrane surface. The permeate side of the membrane is maintained at lower pressure to provide a driving force for transmembrane permeation. $C_{3+}$ hydrocarbons, acid gases and water vapor all permeate the membrane preferentially, resulting in contaminant-enriched permeate stream 108 and contaminant-depleted residue stream 109. An important feature of the invention is to control the amount of gas in stream 108. When both streams are expressed in normalized units, such as standard cubic feet per minute (scfm), it is preferred that the flow per unit time of stream 108 be no more than about 40% of the flow per unit time of the raw gas withdrawn for fuel purposes, stream 101, more preferably no more than about 30% of stream 101 and most preferably no more than about 25%, such as even 20% or less. This control must be accomplished in conjunction with meeting the specifications required for stream 109.

As is familiar to those of skill in the art, the separation performance achieved by the membrane depends on such factors as the membrane selectivity, the pressure ratio between feed and permeate sides, and the membrane area. The transmembrane flux depends on the permeability of the membrane material, the pressure difference across the membrane and the membrane thickness. In light of the teachings given here, it will be appreciated that permeate volume flow can be controlled within the desired limits by appropriate choices of the membrane performance-affecting parameters above in conjunction with a balance between the quantities of material removed in streams 105 and 108. To achieve total desired contaminant removal in stream 105 by condensation alone would necessitate cooling to very low temperatures, and would likely result in hydrate formation. To achieve total desired contaminant removal in stream 108 by membrane separation alone results in excess permeate production and hence inefficient use of the fuel generated. In general, the process yields optimum results when the condensate flow is as high as possible, and correspondingly the permeate flow is as low as possible, without causing hydrate formation or employing external refrigerants.

Specific process-design calculations illustrating this balance between the flows and contents of streams 101, 108 and 105 are given in the Examples section below, and those of skill in the art will be able to perform similar calculations for streams of other compositions and flow rates based on the present teachings. To enable targets for residue stream composition and permeate flow volume to be met, for streams of common composition, such as containing about 15% total $C_{3+}$ hydrocarbons, it is most preferred that the total $C_{3+}$ hydrocarbons removed from stream 101 are distributed roughly equally, on a weight or mass flow basis, between streams 105 and 108. By roughly equally is meant that between about 60 wt % and 40 wt % of the total $C_{3+}$ hydrocarbon contaminants removed from stream 101 are contained in liquid phase stream 105, and correspondingly between about 40 wt % and 60 wt % are contained in membrane permeate stream 108. Taking account of the different compositions of stream 101 and operating conditions that may be encountered, a more general guideline is that the withdrawn total $C_{3+}$ hydrocarbons be distributed roughly between about 80 wt % and 30 wt % in condensate stream 105 (and correspondingly between 20 wt % and 70 wt % in permeate stream 108), more preferably between about 65 wt % and 35 wt % in condensate stream 105 (and between 35 wt % and 65 wt % in permeate stream 108), and most preferably between about 60 wt % and 40 wt % in condensate stream 105 (and between 40 wt % and 60 wt % in permeate stream 108).

In other words, on a mass flow basis, if the total $C_{3+}$ hydrocarbons content flow of the liquid phase stream is L lb/h, and the total $C_{3+}$ hydrocarbons content flow of the membrane permeate is stream is P lb/h, then the percentage distribution of total hydrocarbons in the liquid phase, given by L/(L+P)×100%, is between about 30% and 80% for preferred processes, between about 35% and 65% for more preferred processes, and between about 40% and 60% for the most preferred processes.

Stream 108 is withdrawn from the membrane permeate side and may be directed to any appropriate destination. If stream 100 has passed through a compressor, stream 108 may optionally, and most preferably, be reintroduced into the main gas flow on the low-pressure inlet side of the compressor. However, stream 108 may also be mixed with any other stream of similar pressure or composition that is available, or may be further processed or disposed of as a discrete stream.

Residue stream 109 is typically about 5° C., 10° C. or 15° C. cooler than membrane feed stream 106. This stream is withdrawn from the membrane feed side and passes to heat exchanger 102, from whence it emerges as stream 110 ready for use as fuel as desired.

Except as explicitly set forth otherwise, all of the considerations and preferences expressed above with respect to FIG. 1 apply also to the embodiments of the other figures.

Figure 2:
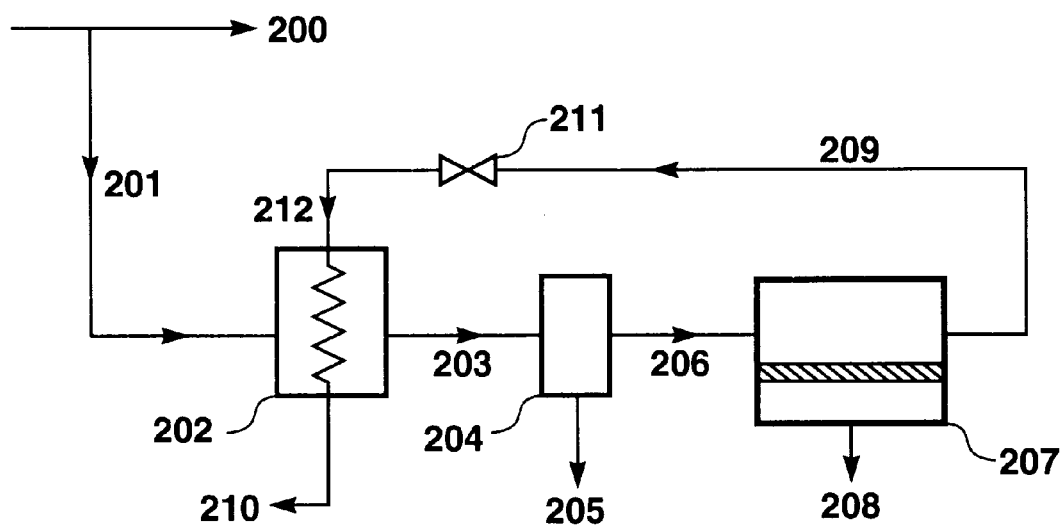
FIG. 2 is a schematic drawing of an alternative embodiment of the invention.

An alternative embodiment in which more cooling is used is shown in FIG. 2. Referring to this figure, stream 201 is withdrawn from high-pressure stream 200, and passes into heat exchanger 202. Cooled stream 203 exits the heat exchanger and passes into phase separator 204. Heavier-hydrocarbon-enriched liquid phase 205 is withdrawn from the phase separator. High-pressure gas stream 206 passes out of the phase separator and into membrane separation unit 207. Permeate stream 208, enriched in $C_{3+}$ hydrocarbons, acid gases and water vapor is withdrawn from the permeate side. Residue stream 209 is withdrawn from the membrane feed side. This stream is already cooler than the membrane feed stream 206 as a result of Joule-Thomson cooling, and is allowed to expand through expansion valve, 211, to form stream 212, thereby lowering its temperature further. The temperature reduction between streams 209 and 212 depends on the pressure reduction. Typically preferred pressures for stream 212 are in the range 150–350 psia, although of course any value that provides appropriate temperature drop may be used. It is convenient, and most preferred, to drop the pressure to about the pressure at which the gas will be used as fuel, since this extracts the maximum cooling without requiring any recompression. As a result of the pressure drop the temperature of stream 212 will typically be in the range −30° C. to 20° C. and will more preferably be substantially below 20° C., such as about 0° C., −10° C., −20° C. or below. Since heavier hydrocarbons and water vapor have been removed from the stream by the membrane unit, it is generally possible to cool the stream to these low temperatures without forming ice or hydrates on equipment surfaces.

Stream 212 is passed into heat exchanger 202, whence it emerges, having been warmed by contact with the incoming raw gas, as stream 210.

Figure 3:
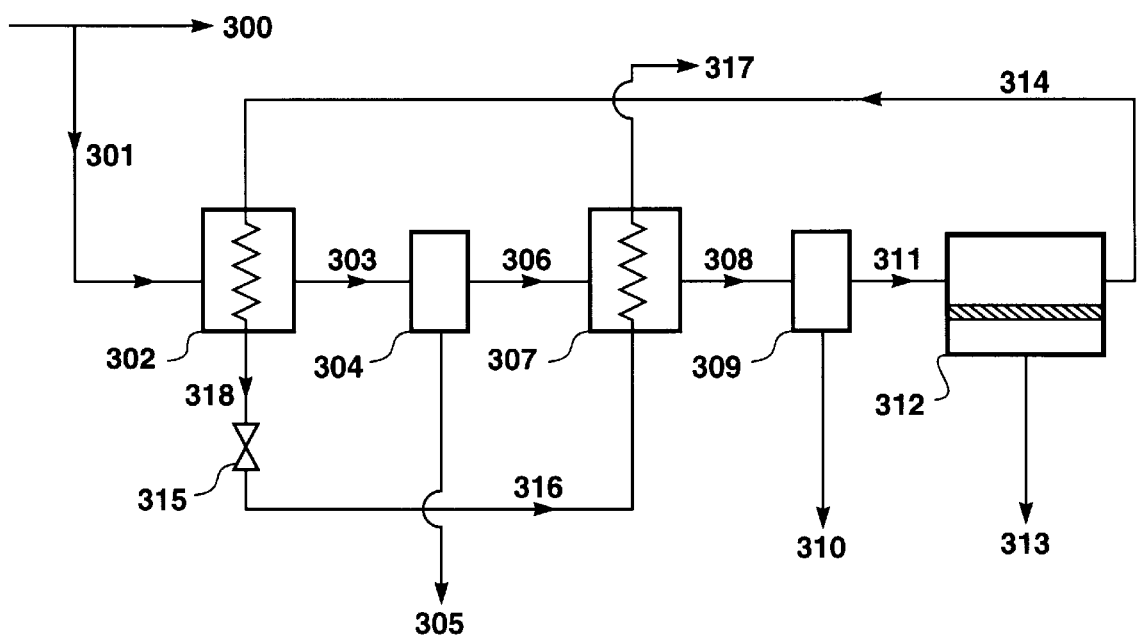
FIG. 3 is a schematic drawing of a preferred embodiment of the invention in which two cooling steps are used.

A particularly preferred embodiment of the invention in which the cooling of the incoming stream is performed in two stages is shown in FIG. 3. Referring to this figure, stream 301 is withdrawn from high-pressure stream 300, and passes into first heat exchanger 302. Cooled stream 303 exits the first heat exchanger and passes into first phase separator 304. Liquid stream 305 is withdrawn from the phase separator. This liquid contains $C_{3+}$ hydrocarbons and water vapor, thereby reducing the concentration of these components in the remaining gas stream 306, making it both dryer and leaner. Stream 306 passes out of the phase separator and into the second heat exchanger, 307, where it is brought into heat-exchanging contact against colder stream 316. Cooled stream 308 passes to second phase separator 309. Second liquid stream 310 is withdrawn from the phase separator. This stream may be combined with stream 305 or sold or disposed of in any way separately, as desired. $C_{3+}$ hydrocarbon depleted gas stream 311 passes out of the phase separator and into membrane separation unit 312. Permeate stream 313 is withdrawn from the permeate side. Residue stream 314 is withdrawn from the membrane feed side and passes to heat exchanger 302, where it is brought into heat-exchanging contact with incoming stream 301. Warmed stream 318 exits the heat exchanger and is allowed to expand through expansion valve, 315, to form cooled, expanded stream 316. This stream passes into heat exchanger 307 and exits as fuel stream 317.

Figure 4:
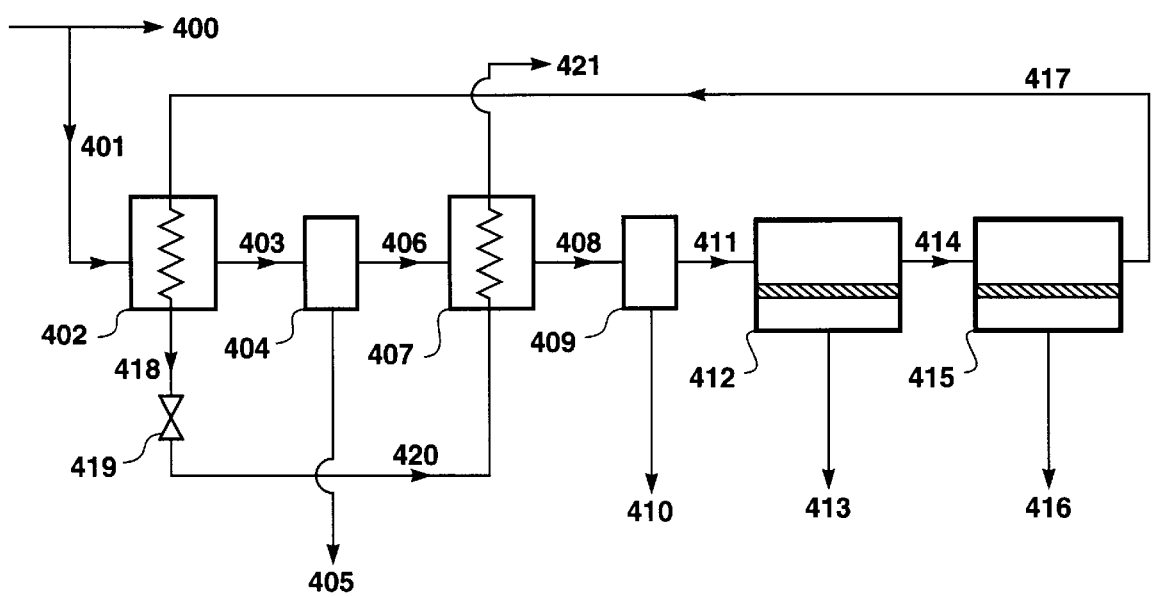
FIG. 4 is a schematic drawing of a preferred embodiment of the invention in which two cooling steps and two membrane separation steps are used.

A preferred embodiment of the invention for treating streams that contain substantial quantities of both $C_{3+}$ hydrocarbons and hydrogen sulfide is shown in FIG. 4. Referring to this figure, stream 401 is withdrawn from high-pressure stream 400, and passes into first heat exchanger 402. Cooled stream 403 exits the first heat exchanger and passes into first phase separator 404. Liquid stream 405 is withdrawn from the phase separator. Gas stream 406 passes out of the phase separator and into the second heat exchanger, 407, where it is brought into heat-exchanging contact against colder stream 420. Cooled stream 408 passes to second phase separator 409. Second liquid stream 410 is withdrawn from the phase separator. $C_{3+}$ hydrocarbon depleted gas stream 411 passes out of the phase separator and into first membrane separation unit 412. This membrane unit contains a membrane made from a material preferred for $C_{3+}$ hydrocarbons removal, such as silicone rubber. Permeate stream 413, enriched in $C_{3+}$ hydrocarbons, is withdrawn from the permeate side. Residue stream 414 is withdrawn from the feed side of unit 412 and passes as feed to second membrane unit 415. This unit contains a membrane made from a material preferred for hydrogen sulfide removal, such as a polyamide-polyether block copolymer. Permeate stream 416, enriched in hydrogen sulfide, is withdrawn from the permeate side. Residue stream, 417, passes to heat exchanger 402, where it is brought into heat-exchanging contact with incoming stream 401. Warmed stream 418 exits the heat exchanger and is allowed to expand through expansion valve, 419, to form cooled, expanded stream 420. This stream passes into heat exchanger 407 and exits the process as fuel stream 421. Of course, if preferred, the more hydrogen-sulfide-selective membrane could be used first, in membrane unit 412, and the more hydrocarbon-selective membrane could be used second, in membrane unit 415.

Figure 6:
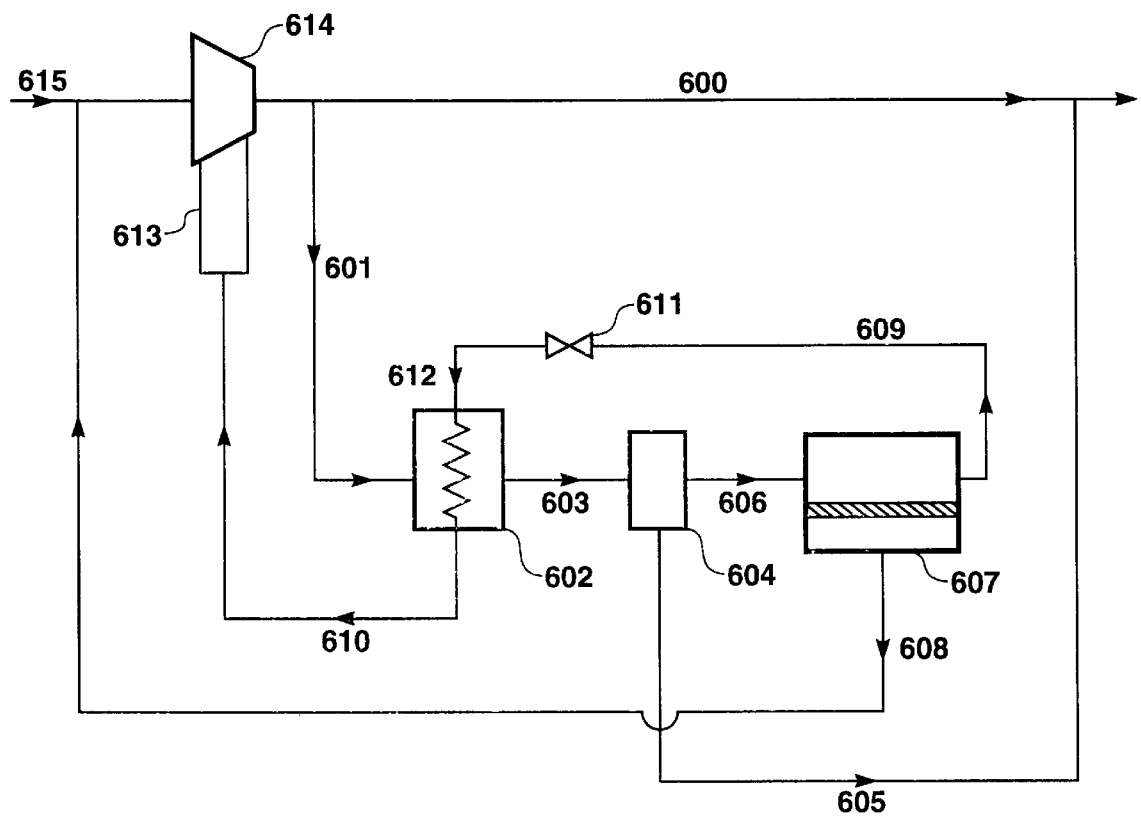
FIG. 6 is a schematic drawing of an embodiment of the invention in which the condensate and membrane permeate stream are returned to the main gas line.

An embodiment in which both the condensate and membrane permeate streams are returned to the main gas flow is shown in FIG. 6. Referring to this figure, stream 601 is withdrawn from high-pressure stream 600, and passes into heat exchanger 602. Cooled stream 603 exits the heat exchanger and passes into phase separator 604. Heavier-hydrocarbon-enriched liquid phase 605 is withdrawn from the phase separator. This liquid is not required as a separate product and is mixed back into high-pressure stream 600 in any convenient manner, for example by spraying or blowing into the discharge of the compressor. High-pressure gas stream 606 passes out of the phase separator and into membrane separation unit 607. Permeate stream 608, enriched in $C_{3+}$ hydrocarbons, acid gases and water vapor is withdrawn from the permeate side. This stream is returned on the low-pressure inlet side of compressor 614 by mixing with the main gas stream 615 entering the compressor. Residue stream 609 is withdrawn from the membrane feed side and allowed to expand through expansion valve, 611, to form stream lower-pressure, cooled stream 612. Stream 612 is passed into heat exchanger 602, whence it emerges, having been warmed by contact with the incoming raw gas, as stream 610. Stream 610, which is now leaner, sweeter and dryer than stream 601, then passes to the combustion chamber of engine 613, which is used to drive compressor 614.

The invention has been described mostly as it relates to the upgrading of field gas for use as fuel in field engines. Those of skill in the art will appreciate that the processes provided by the invention are equally applicable to any other situation where sub-quality gas exists and there is a need to upgrade it in a simple, cost-effective manner, such as within the gas processing plant itself.

As has been mentioned, the process is also useful in providing fuel gas for other prime movers, in particular turbines used to drive compressors and/or in cogeneration of electric power.

The invention is now illustrated in further detail by specific examples. These examples are intended to further clarify the invention, and are not intended to limit the scope in any way.

EXAMPLES

Example 1

A computer calculation was performed with a modeling program, ChemCad III (ChemStations, Inc., Houston, Tex.), to simulate the treatment of a typical raw gas stream containing about 70% methane and about 15% $C_{3+}$ hydrocarbons. It was assumed that the treatment must yield a fuel gas flow of 0.5 MMscfd. The raw stream to be treated was assumed to have the following volume composition:

Methane 72.8%

Ethane 9.6%

Propane 9.9% i-Butane 2.4% n-Butane 2.5% n-Pentane 1.3%

Carbon dioxide 1.3%

Water 0.1%

Hydrogen sulfide - -

The treatment process was assumed to be carried out according to the process design shown in FIG. 3, that is, by cooling the raw stream in two steps, followed by a membrane separation step carried out using a silicone rubber membrane housed in spiral-wound modules.

The results of the calculations are shown in Tables 1 and 2. The stream numbers correspond to FIG. 3.

TABLE 1

| Component/<br>Parameter | Stream<br>301 | Stream<br>305 | Stream<br>310 | Stream<br>311 | Stream<br>313 | Stream<br>314 | Stream<br>316 |
|---|---|---|---|---|---|---|---|
| Flow rate (MMscfd) | 0.70 | n/a | n/a | 0.64 | 0.15 | 0.50 | 0.5 |
| Flow rate (lbmol/h) | 81.24 | 2.26 | 4.36 | 74.62 | 17.12 | 57.50 | 57.50 |
| Temperature (° C.) | 35 | 30 | 20 | 20 | 7 | 7 | −21 |
| Pressure (psia) | 957 | 957 | 957 | 957 | 65 | 955 | 150 |
| Component (mol %) | | | | | | | |
| Carbon dioxide | 1.30 | 0.91 | 1.0 | 1.34 | 2.46 | 1.0 | 120 |
| Methane | 72.84 | 30.53 | 33.03 | 76.45 | 61.0 | 81.05 | 81.05 |
| Ethane | 9.57 | 11.08 | 12.07 | 9.38 | 13.04 | 8.29 | 8.29 |
| Propane | 9.95 | 23.83 | 24.85 | 8.66 | 14.11 | 7.03 | 7.03 |
| i-Butane | 2.43 | 9.56 | 9.22 | 1.82 | 3.99 | 1.18 | 1.18 |
| n-Butane | 2.49 | 11.87 | 10.94 | 1.71 | 3.75 | 1.11 | 1.11 |
| n-Pentane | 1.29 | 11.18 | 8.14 | 0.59 | 1.46 | 0.33 | 0.33 |
| Water | 0.12 | 1.04 | 0.74 | 0.05 | 0.18 | 0.01 | 0.01 |

Membrane Area = 4 m$^2$

TABLE 2

| Component/<br>Parameter | Stream<br>301 | Stream<br>305 | Stream<br>310 | Stream<br>311 | Stream<br>313 | Stream<br>314 | Stream<br>316 |
|---|---|---|---|---|---|---|---|
| Flow rate (lb/h) | 1,896 | 90.2 | 166 | 1,640 | 455 | 1,185 | 1,185 |
| Temperature (° C.) | 35 | 30 | 20 | 20 | 7 | 7 | −21 |
| Pressure (psia) | 957 | 957 | 957 | 957 | 65 | 955 | 150 |
| Component (lb/h) | | | | | | | |
| Carbon dioxide | 46.8 | 0.9 | 1.9 | 43.9 | 18.6 | 25.4 | 25.4 |
| Methane | 949 | 11.1 | 23.1 | 915 | 168 | 748 | 748 |
| Ethane | 234 | 7.5 | 15.8 | 210 | 67.1 | 143 | 143 |
| Propane | 356 | 23.8 | 47.7 | 285 | 107 | 178 | 178 |
| i-Butane | 115 | 12.6 | 23.4 | 79.0 | 39.7 | 39.3 | 39.3 |
| n-Butane | 118 | 15.6 | 27.7 | 74.3 | 37.3 | 36.9 | 36.9 |
| n-Pentane | 75.6 | 18.3 | 25.6 | 31.8 | 18.0 | 13.8 | 13.8 |
| Water | 1.7 | 0.4 | 0.58 | 0.69 | 0.57 | 0.12 | 0.12 |

As can be seen, the process is able to deliver 0.5 MMscfd of fuel-grade gas with a methane content of 81%. By lowering the total $C_{3+}$ hydrocarbon content from 16.2% to 9.6%, the heating value of the gas was reduced from $5.2 \times 10^5$ Btu/lbmol to $4.7 \times 10^5$ Btu/lbmol. To produce this fuel gas from a raw stream of flow rate 0.7 MMscfd requires only 4 m$^2$ of membrane area, which can be incorporated in one small membrane module.

The ratio of the low-pressure permeate flow (stream 313) to the raw gas withdrawal rate (stream 301) is 0.15 MMscfd:0.7 MMscfd, or 21%. Thus, of the gas withdrawn, only 21% would require recompression to enable it to be returned to the main flow. The $C_{3+}$ hydrocarbons are distributed about 202 lb/h in the permeate stream (313) and 194 lb/h in the combined condensate streams (305 plus 310). In this case, therefore, according to the distribution relationship given in the Detailed Description of the Invention above, the percentage L/(L+P)×100% is [194/396×100%], that is, 49%.

Example 2 (not in accordance with the invention)

Figure 5:
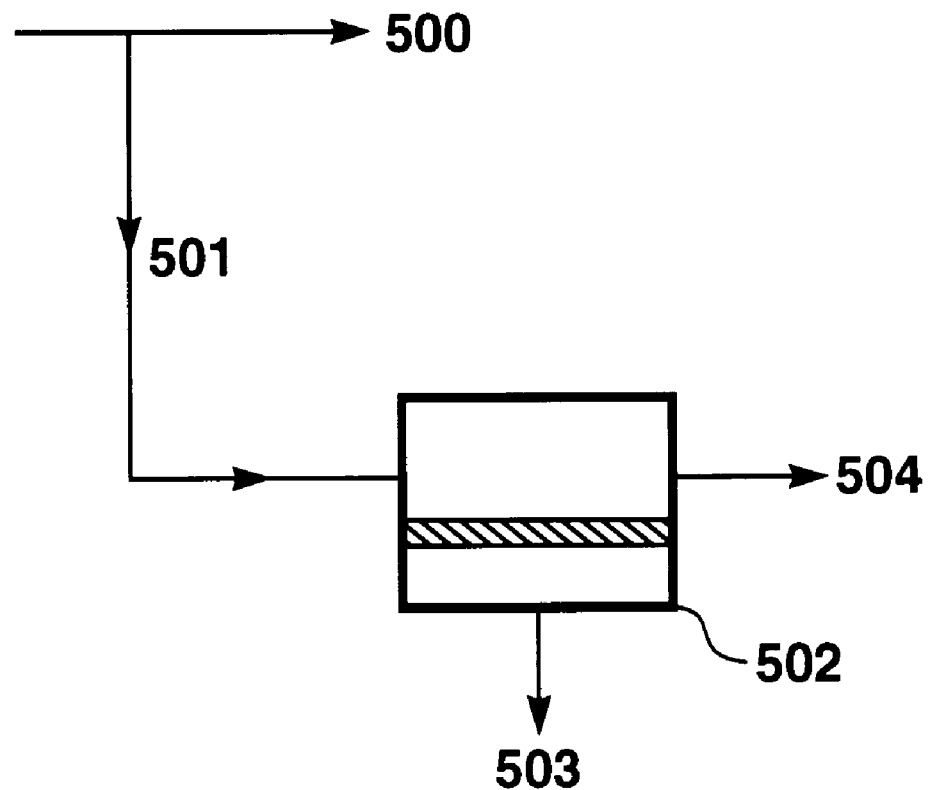
FIG. 5 is a schematic drawing of a membrane separation step.

The calculation of Example 1 was repeated, again assuming that raw gas of the composition above was to be treated to produce 0.5 MMscfd of fuel-grade gas. This time, however, it was assumed that the gas was treated solely by a membrane separation step, as shown in FIG. 5. Referring to this figure, stream 501 is withdrawn from high-pressure stream 500, and passes to the feed side of membrane separation unit 502. Permeate stream 503, enriched in $C_{3+}$ hydrocarbons, is withdrawn from the permeate side. Residue stream 504 is withdrawn from the feed side of unit 502. The membrane used for the separation was assumed to be silicone rubber, as in Example 1. In this configuration, the stream is not cooled before it enters the membrane unit, so slightly lower hydrocarbon fluxes were assumed.

The results of the calculations are shown in Tables 3 and 4. The stream numbers correspond to FIG. 5.

TABLE 3

| Component/<br>Parameter | Stream<br>501 | Stream<br>503 | Stream<br>504 |
|---|---|---|---|
| Flow rate (MMscfd) | 0.91 | 0.41 | 0.50 |
| Flow rate (lbmol/h) | 105.6 | 47.2 | 58.4 |
| Temperature (° C.) | 35 | 12 | 12 |
| Pressure (psia) | 957 | 65 | 957 |
| Component (mol %) | | | |
| Carbon dioxide | 1.30 | 2.17 | 0.62 |
| Methane | 72.84 | 64.1 | 79.9 |

TABLE 3-continued

| Component/Parameter | Stream 501 | Stream 503 | Stream 504 |
|---|---|---|---|
| Ethane | 9.57 | 9.78 | 9.40 |
| Propane | 9.95 | 12.84 | 7.61 |
| i-Butane | 2.43 | 4.22 | 1.0 |
| n-Butane | 2.49 | 4.32 | 1.02 |
| n-Pentane | 1.29 | 2.33 | 0.49 |
| Water | 0.12 | 0.25 | 0.03 |

Membrane Area = 12 m$^2$

TABLE 4

| Component/Parameter | Stream 501 | Stream 503 | Stream 504 |
|---|---|---|---|
| Flow rate (lb/h) | 2,465 | 1,252 | 1,213 |
| Temperature (° C.) | 35 | 12 | 12 |
| Pressure (psia) | 957 | 65 | 957 |
| Component (lb/h) | | | |
| Carbon dioxide | 60.8 | 45.0 | 15.8 |
| Methane | 1,234 | 485 | 749 |
| Ethane | 304 | 139 | 165 |
| Propane | 463 | 267 | 196 |
| i-Butane | 149 | 116 | 33.8 |
| n-Butane | 153 | 118 | 34.5 |
| n-Pentane | 98 | 79.4 | 18.9 |
| Water | 2.2 | 2.2 | 0.03 |

The process is able to deliver a fuel grade gas of similar quality to that of Example 1. In this case, however, more raw gas must be processed-0.91 MMscfd compared with 0.7 MMscfd in Example 1. To process this amount of gas, more membrane area is required—12 m$^2$ compared with 4 m$^2$ for Example 1.

More importantly, the membrane-only process produces a much larger permeate stream—0.41 MMscfd compared with 0.15 MMscfd previously. In this process, 2.7 times more low-pressure gas is generated to make the same amount of fuel gas than in the process of the invention. In other words, the invention reduces the amount of low-pressure gas by 63% compared with the equivalent prior art process.

In this Example, the ratio of the low-pressure permeate flow (stream 313) to the raw gas withdrawal rate (stream 301) is 0.41 MMscfd:0.91 MMscfd, or 45%, compared with only 21% for Example 1. Also, since no cooling takes place, no NGL product is made.

Example 3

A computer calculation was performed with a modeling program, ChemCad III (ChemStations, Inc., Houston, Tex.), to simulate the treatment of a typical hydrogen-sulfide laden raw gas stream, according to the process of the invention, as shown in the process configuration of FIG. 4. It was assumed that the treatment must yield a fuel gas flow of 0.5 MMscfd. The raw stream was assumed to have the following volume composition:

Methane 72.6%

Ethane 9.5%

Propane 9.9% i-Butane 2.4% n-Butane 2.5% n-Pentane 1.3%

Carbon dioxide 1.3%

Water 0.1%

Hydrogen sulfide 0.3%

The treatment process was assumed to be carried out using a silicone rubber membrane in membrane unit 412 and a polyamide-polyether block copolymer membrane in membrane unit 415 to increase hydrogen sulfide removal.

The results of the calculations are shown in Tables 5 and 6. The stream numbers correspond to FIG. 4.

TABLE 5

| Component/Parameter | Stream 401 | Stream 405 | Stream 410 | Stream 411 | Stream 413 | Stream 414 | Stream 420 |
|---|---|---|---|---|---|---|---|
| Flow rate (MMscfd) | 0.73 | n/a | n/a | 0.67 | 0.15 | 0.52 | 0.5 |
| Flow rate (lbmol/h) | 84.72 | 2.37 | 4.56 | 77.78 | 17.23 | 60.55 | 58.45 |
| Temperature (° C.) | 35 | 30 | 20 | 20 | 8 | 8 | -21 |
| Pressure (psia) | 957 | 957 | 957 | 957 | 65 | 955 | 150 |
| Component (mol %) | | | | | | | |
| Carbon dioxide | 1.30 | 0.91 | 1.0 | 1.33 | 2.46 | 1.01 | 0.87 |
| Methane | 72.62 | 30.45 | 32.94 | 76.24 | 60.42 | 80.74 | 81.37 |
| Ethane | 9.54 | 11.04 | 12.02 | 9.35 | 12.97 | 8.32 | 8.18 |
| Propane | 9.92 | 23.73 | 24.74 | 8.63 | 14.05 | 7.08 | 6.90 |
| i-Butane | 2.43 | 9.52 | 9.18 | 1.81 | 3.99 | 1.20 | 1.15 |
| n-Butane | 2.48 | 11.82 | 10.88 | 1.71 | 3.75 | 1.12 | 1.08 |
| n-Pentane | 1.29 | 11.12 | 8.09 | 0.59 | 1.46 | 0.34 | 0.33 |
| Water | 0.12 | 1.02 | 0.73 | 0.05 | 0.19 | 0.01 | 0.01 |
| Hydrogen sulfide | 0.30 | 0.38 | 0.41 | 0.29 | 0.72 | 0.17 | 0.11 |

Membrane Area = 4 m$^2$ (unit 412) 20 m$^2$ (unit 415)

TABLE 6

| Component/Parameter | Stream 401 | Stream 405 | Stream 410 | Stream 411 | Stream 413 | Stream 414 | Stream 416 | Stream 420 |
|---|---|---|---|---|---|---|---|---|
| Flow rate (lb/h) | 1,980 | 94.5 | 174 | 1,712 | 460 | 1,252 | 53.1 | 1,199 |
| Temperature (° C.) | 35 | 30 | 20 | 20 | 8 | 8 | — | −21 |
| Pressure (psia) | 957 | 957 | 957 | 957 | 65 | 955 | 65 | 150 |
| Component (lb/h) | | | | | | | | |
| Carbon dioxide | 48.6 | 0.95 | 2.01 | 45.7 | 18.6 | 27.0 | 4.6 | 22.5 |
| Methane | 987 | 11.6 | 24.1 | 951 | 167 | 784 | 21.3 | 763 |
| Ethane | 243 | 7.9 | 16.5 | 219 | 67.2 | 152 | 7.7 | 144 |
| Propane | 370 | 24.8 | 49.8 | 296 | 107 | 189 | 11.3 | 178 |
| i-Butane | 120 | 13.1 | 24.3 | 82.0 | 40.0 | 42.1 | 3.0 | 39.1 |
| n-Butane | 122 | 16.3 | 28.9 | 77.1 | 37.5 | 39.5 | 2.8 | 36.7 |
| n-Pentane | 78.6 | 19.0 | 26.6 | 32.9 | 18.1 | 14.8 | 1.1 | 13.8 |
| Water | 1.8 | 0.44 | 0.60 | 0.71 | 0.58 | 0.13 | 0.01 | 0.13 |
| Hydrogen sulfide | 8.7 | 0.30 | 0.63 | 7.7 | 4.3 | 3.5 | 1.3 | 2.2 |

As in Example 1, the process delivers 0.5 MMscfd of fuel-grade gas with a methane content of 81%. The total $C_{3+}$ hydrocarbon content is reduced from 16.1% in the raw gas to 9.5% in the fuel gas, and the heating value from $5.2 \times 10^5$ Btu/lbmol to $4.6 \times 10^5$ Btu/lbmol. The hydrogen sulfide content is reduced from 0.3% to 0.1%.

The ratio of the low-pressure permeate flow (streams 413 and 416) to the raw gas withdrawal rate (stream 401) is again about 20% and the $C_{3+}$ hydrocarbons are distributed roughly equally between the permeate streams (220 lb/h) and the condensate streams (202 lb/h). In this case, the percentage $L/(L+P) \times 100\%$ is about 48%.

Example 4 (not in accordance with the invention)

A calculation similar to that of Example 2 was performed, this time using a gas composition containing 0.2% hydrogen sulfide. The calculation assumed the membrane-only configuration of FIG. 5 and the same membrane permeation properties as in Example 2.

The gas composition by volume was assumed to be as follows:

Methane 72.7%

Ethane 9.6%

Propane 9.9% i-Butane 2.4% n-Butane 2.5% n-Pentane 1.3%

Carbon dioxide 1.3%

Water 0.1%

Hydrogen sulfide 0.2%

The results of the calculations are shown in Tables 7 and 8. The stream numbers correspond to FIG. 5.

TABLE 7

| Component/Parameter | Stream 501 | Stream 503 | Stream 504 |
|---|---|---|---|
| Flow rate (MMscfd) | 0.91 | 0.41 | 0.50 |
| Flow rate (lbmol/h) | 105.6 | 47.3 | 58.3 |
| Temperature (° C.) | 35 | 12 | 12 |
| Pressure (psia) | 957 | 65 | 957 |
| Component (mol %) | | | |
| Carbon dioxide | 1.30 | 2.16 | 0.61 |
| Methane | 72.70 | 63.9 | 79.9 |
| Ethane | 9.55 | 9.74 | 9.40 |

TABLE 7-continued

| Component/Parameter | Stream 501 | Stream 503 | Stream 504 |
|---|---|---|---|
| Propane | 9.93 | 12.79 | 7.60 |
| i-Butane | 2.43 | 4.19 | 1.0 |
| n-Butane | 2.49 | 4.29 | 1.02 |
| n-Pentane | 1.29 | 2.32 | 0.45 |
| Water | 0.12 | 0.25 | 0.03 |
| Hydrogen sulfide | 0.20 | 0.38 | 0.05 |

Membrane Area = 12 $m^2$

TABLE 8

| Component/Parameter | Stream 501 | Stream 503 | Stream 504 |
|---|---|---|---|
| Flow rate (lb/h) | 2,467 | 1,257 | 1,210 |
| Temperature (° C.) | 35 | 12 | 12 |
| Pressure (psia) | 957 | 65 | 957 |
| Component (lb/h) | | | |
| Carbon dioxide | 60.7 | 45.0 | 15.7 |
| Methane | 1,232 | 485 | 747 |
| Ethane | 303 | 139 | 165 |
| Propane | 462 | 267 | 195 |
| i-Butane | 149 | 116 | 33.6 |
| n-Butane | 153 | 118 | 34.4 |
| n-Pentane | 98 | 79.3 | 18.8 |
| Water | 2.2 | 2.2 | 0.03 |
| Hydrogen sulfide | 7.2 | 6.3 | 0.94 |

As in Example 2, the process requires 0.91 MMscfd of raw gas to be processed to deliver a 0.5 MMscfd fuel gas stream. About 45% of the raw gas forms the low-pressure permeate stream.

Example 5

The computer calculation of Example 3 was repeated assuming a gas with a higher hydrogen sulfide content (1%). The gas composition was assumed to be as follows:

Methane 72.1%

Ethane 9.5%

Propane 9.8% i-Butane 2.4% n-Butane 2.5% n-Pentane 1.3%

Carbon dioxide 1.3%

Water 0.1%

Hydrogen sulfide 1.0%

All other parameters were assumed to be the same as in Example 3. The results of the calculations are shown in Tables 9 and 10. The stream numbers correspond to FIG. 4.

TABLE 9

| Component/<br>Parameter | Stream<br>401 | Stream<br>405 | Stream<br>410 | Stream<br>411 | Stream<br>413 | Stream<br>414 | Stream<br>420 |
| --- | --- | --- | --- | --- | --- | --- | --- |
| Flow rate (MMscfd) | 0.79 | n/a | n/a | 0.72 | 0.15 | 0.57 | 0.5 |
| Flow rate (lbmol/h) | 91.68 | 2.60 | 5.00 | 84.08 | 17.49 | 66.59 | 58.11 |
| Temperature (° C.) | 35 | 30 | 20 | 20 | 9 | 9 | −24 |
| Pressure (psia) | 957 | 957 | 957 | 957 | 65 | 955 | 150 |
| Component (mol %) | | | | | | | |
| Carbon dioxide | 1.30 | 0.90 | 1.0 | 1.33 | 2.44 | 1.03 | 0.58 |
| Methane | 72.11 | 30.26 | 32.74 | 75.75 | 59.16 | 80.11 | 82.61 |
| Ethane | 9.48 | 10.96 | 11.92 | 9.29 | 12.78 | 8.37 | 7.85 |
| Propane | 9.85 | 23.52 | 24.48 | 8.55 | 13.87 | 7.16 | 6.48 |
| i-Butane | 2.41 | 9.43 | 9.07 | 1.80 | 3.96 | 1.23 | 1.06 |
| n-Butane | 2.47 | 11.70 | 10.75 | 1.69 | 3.72 | 1.15 | 0.99 |
| n-Pentane | 1.28 | 10.98 | 7.96 | 0.58 | 1.45 | 0.35 | 0.30 |
| Water | 0.11 | 0.98 | 0.73 | 0.05 | 0.19 | 0.01 | 0.01 |
| Hydrogen sulfide | 1.00 | 1.26 | 1.36 | 0.97 | 2.43 | 0.59 | 0.11 |

Membrane Area = 4 m² (unit 412) 80 m² (unit 415)

TABLE 10

| Component/<br>Parameter | Stream<br>401 | Stream<br>405 | Stream<br>410 | Stream<br>411 | Stream<br>413 | Stream<br>414 | Stream<br>416 | Stream<br>420 |
| --- | --- | --- | --- | --- | --- | --- | --- | --- |
| Flow rate (lb/h) | 2,150 | 103 | 190 | 1,857 | 470 | 1,386 | 213 | 1,173 |
| Temperature (° C.) | 35 | 30 | 20 | 20 | 9 | 9 | — | −24 |
| Pressure (psia) | 957 | 957 | 957 | 957 | 65 | 955 | 65 | 150 |
| Component (lb/h) | | | | | | | | |
| Carbon dioxide | 52.3 | 1.0 | 2.2 | 49.0 | 18.8 | 30.3 | 15.4 | 14.9 |
| Methane | 1,061 | 12.6 | 26.2 | 1,022 | 166 | 856 | 85.6 | 770 |
| Ethane | 261 | 8.6 | 17.9 | 235 | 67.2 | 168 | 30.4 | 137 |
| Propane | 398 | 27.0 | 53.9 | 317 | 107 | 210 | 44.1 | 166 |
| i-Butane | 128 | 14.3 | 26.3 | 87.8 | 40.3 | 47.5 | 11.8 | 35.7 |
| n-Butane | 131 | 17.7 | 31.2 | 82.5 | 37.8 | 44.6 | 11.1 | 33.5 |
| n-Pentane | 84.5 | 20.6 | 28.7 | 35.2 | 18.3 | 16.9 | 4.2 | 12.7 |
| Water | 1.9 | 0.46 | 0.65 | 0.77 | 0.61 | 0.17 | 0.05 | 0.12 |
| Hydrogen sulfide | 31.2 | 1.1 | 2.3 | 27.8 | 14.5 | 13.3 | 11.2 | 2.2 |

As in Example 1, the process delivers 0.5 MMscfd of fuel-grade gas with a methane content of 82%. The total $C_{3+}$ hydrocarbon content is reduced from 16% in the raw gas to 8.8% in the fuel gas, and the hydrogen sulfide content is reduced by 90%, from 1% to 0.1%.

The ratio of the low-pressure permeate flow (streams 413 and 416) to the raw gas withdrawal rate (stream 401) is about 30% in this case ((0.15 MMscfd+0.08 MMscfd)/0.79 MMscfd) and the $C_{3+}$ hydrocarbons are again distributed roughly equally between the permeate streams (275 lb/h) and the condensate streams (220 lb/h). In this case, the percentage L/(L+P)×100% is about 44%.

I claim:

1. A process for conditioning a portion of a high-pressure gas stream, the gas stream comprising methane and $C_{3+}$ hydrocarbons, and the process comprising the following steps:

(a) withdrawing the portion from the high-pressure gas stream;

(b) passing the portion through a heat-exchange step in heat-exchanging relationship against a membrane residue stream, thereby cooling the portion;

(c) separating the portion into a liquid phase comprising $C_{3+}$ hydrocarbons and a gas phase depleted in $C_{3+}$ hydrocarbons;

(d) providing a membrane unit having a feed side and a permeate side and containing a membrane selective for $C_{3+}$ hydrocarbons over methane;

(e) passing the gas phase across the feed side under conditions in which transmembrane permeation occurs;

(f) withdrawing from the feed side the membrane residue stream;

(g) withdrawing from the permeate side a membrane permeate stream enriched in $C_{3+}$ hydrocarbons compared with the gas phase;

(h) passing the membrane residue stream to the heat-exchange step (b);

(i) withdrawing the membrane residue stream from the heat-exchange step; the process being characterized in that the liquid phase has a $C_{3+}$ hydrocarbons flow of L lb/h, the membrane permeate stream has a second $C_{3+}$ hydrocarbons flow of P lb/h and the distribution of $C_{3+}$ hydrocarbons between the liquid phase and the membrane permeate stream is such that L/(L+P)×100% is a percentage between about 30% and 80%.

2. The process of claim 1, further comprising:

(j) using the membrane residue stream as combustion fuel for a prime mover.

3. The process of claim 2, wherein the high-pressure gas stream is created by a compressor driven by a gas engine and wherein step (j) comprises using the membrane residue stream as fuel for the gas engine.

4. The process of claim 1, wherein step (b) is carried out in two heat-exchange stages, that is, a first heat-exchange stage and a second heat-exchange stage.

5. The process of claim 4, further comprising expanding, and thereby cooling, the membrane residue stream prior to passing the membrane residue stream to the second heat-exchange stage.

6. The process of claim 1, further comprising expanding, and thereby cooling, the membrane residue stream prior to passing the membrane residue stream to the heat exchange step.

7. The process of claim 1, wherein the high-pressure gas stream is created by compressing a lower-pressure gas stream and the membrane permeate stream is returned to the lower-pressure gas stream.

8. The process of claim 1, wherein the high-pressure gas stream also comprises hydrogen sulfide.

9. The process of claim 1, wherein the membrane is a polymeric membrane comprising silicone rubber.

10. The process of claim 1, wherein the membrane is a polymeric membrane comprising a superglassy polymer.

11. The process of claim 1, wherein the membrane is a polymeric membrane comprising a polyamide-polyether block copolymer.

12. The process of claim 1, further comprising returning the liquid phase to the high-pressure gas stream.

13. The process of claim 1, wherein the percentage is between about 35% and 65%.

14. The process of claim 1, wherein the percentage is between about 40% and 60%.

15. The process of claim 1, wherein the portion has a first volume flow rate and the membrane permeate stream has a permeate volume flow rate, and wherein the permeate volume flow rate is no more than about 30% of the first volume flow rate.

16. The process of claim 15, wherein the permeate volume flow rate is no more than about 25% of the first volume flow rate.

17. A process for conditioning a portion of a high-pressure gas stream, the gas stream comprising methane, hydrogen sulfide, $C_{3+}$ hydrocarbons and water vapor, and the process comprising the following steps:

(a) withdrawing the portion from the high-pressure gas stream;

(b) passing the portion through a first heat-exchanger in heat-exchanging relationship against a membrane residue stream, thereby cooling the portion;

(c) separating the portion into a first liquid phase, comprising $C_{3+}$ hydrocarbons, hydrogen sulfide and water, and a first gas phase depleted in $C_{3+}$ hydrocarbons, hydrogen sulfide and water vapor;

(d) expanding the membrane residue stream to form an expanded, cooled membrane residue stream;

(e) passing the first gas phase through a second heat-exchanger in heat-exchanging relationship against the expanded, cooled membrane residue stream, thereby cooling the first gas phase;

(f) separating the first gas phase into a second liquid phase, comprising $C_{3+}$ hydrocarbons, hydrogen sulfide and water, and a second gas phase depleted in $C_{3+}$ hydrocarbons, hydrogen sulfide and water vapor;

(g) providing a membrane unit having a feed side and a permeate side and containing a membrane selective for $C_{3+}$ hydrocarbons, hydrogen sulfide and water vapor over methane;

(h) passing the second gas phase across the feed side under conditions in which transmembrane permeation occurs;

(i) withdrawing from the feed side the membrane residue stream, the membrane residue stream being leaner, dryer and sweeter than the portion;

(j) withdrawing from the permeate side a membrane permeate stream enriched in $C_{3+}$ hydrocarbons, hydrogen sulfide and water vapor compared with the second gas phase;

(k) passing the membrane residue stream to the first heat exchanger, thereby carrying out step (b);

(l) withdrawing the membrane residue stream from the second heat exchanger;

(m) using the membrane residue stream as combustion fuel for a prime mover.

18. The process of claim 17, wherein the high-pressure gas stream is created by compressing a lower-pressure gas stream and the membrane permeate stream is returned to the lower-pressure gas stream.

19. The process of claim 17, further comprising returning the first and second liquid phases to the high-pressure gas stream.

20. The process of claim 17, wherein the process is characterized in that the first and second liquid phases have a combined $C_{3+}$ hydrocarbons flow of L lb/h, the membrane permeate stream has a second $C_{3+}$ hydrocarbons flow of P lb/h and the distribution of $C_{3+}$ hydrocarbons between the liquid phases and the membrane permeate stream is such that L/(L+P)×100% is a percentage between about 30% and 80%.

* * * * *